A. E. COOK & T. VAN TUYL.
TRACTION ATTACHMENT FOR AUTOMOBILES.
APPLICATION FILED DEC. 17, 1910.
1,180,475.
Patented Apr. 25, 1916
7 SHEETS—SHEET 6.
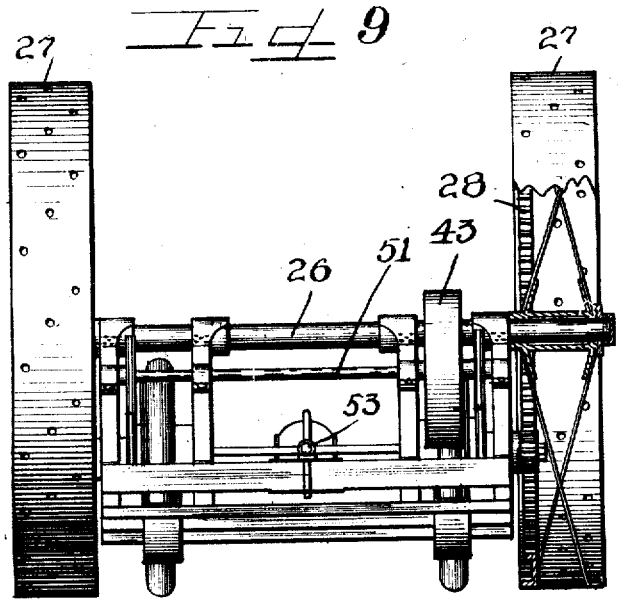
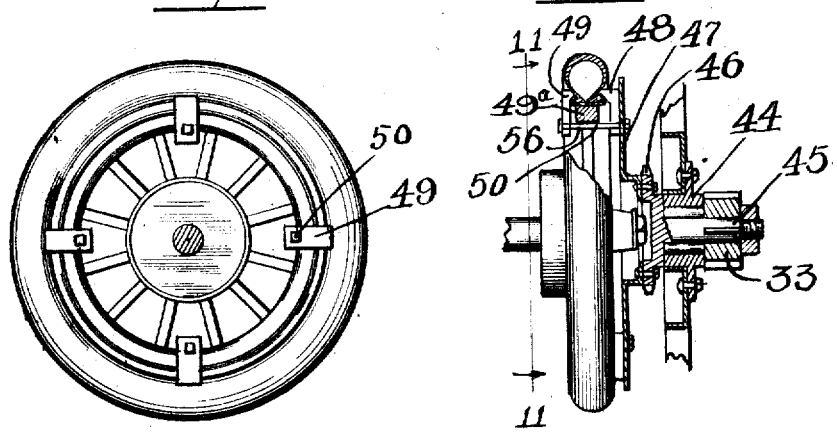

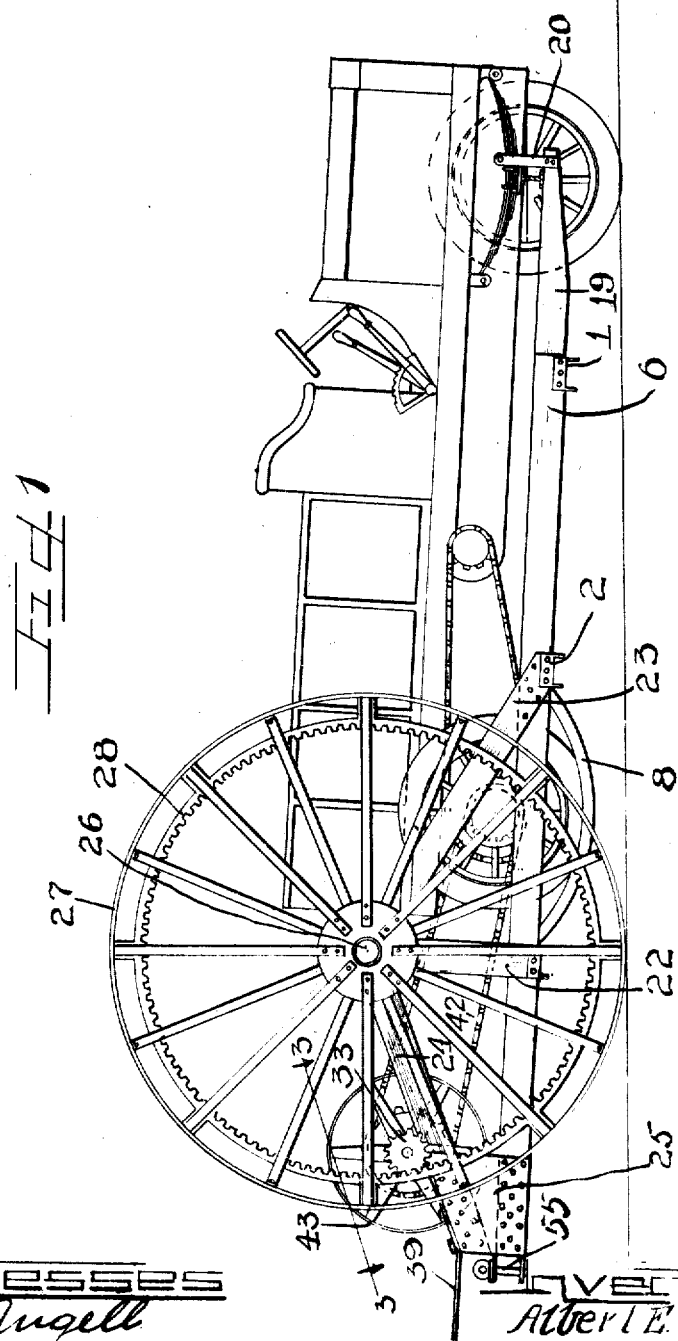

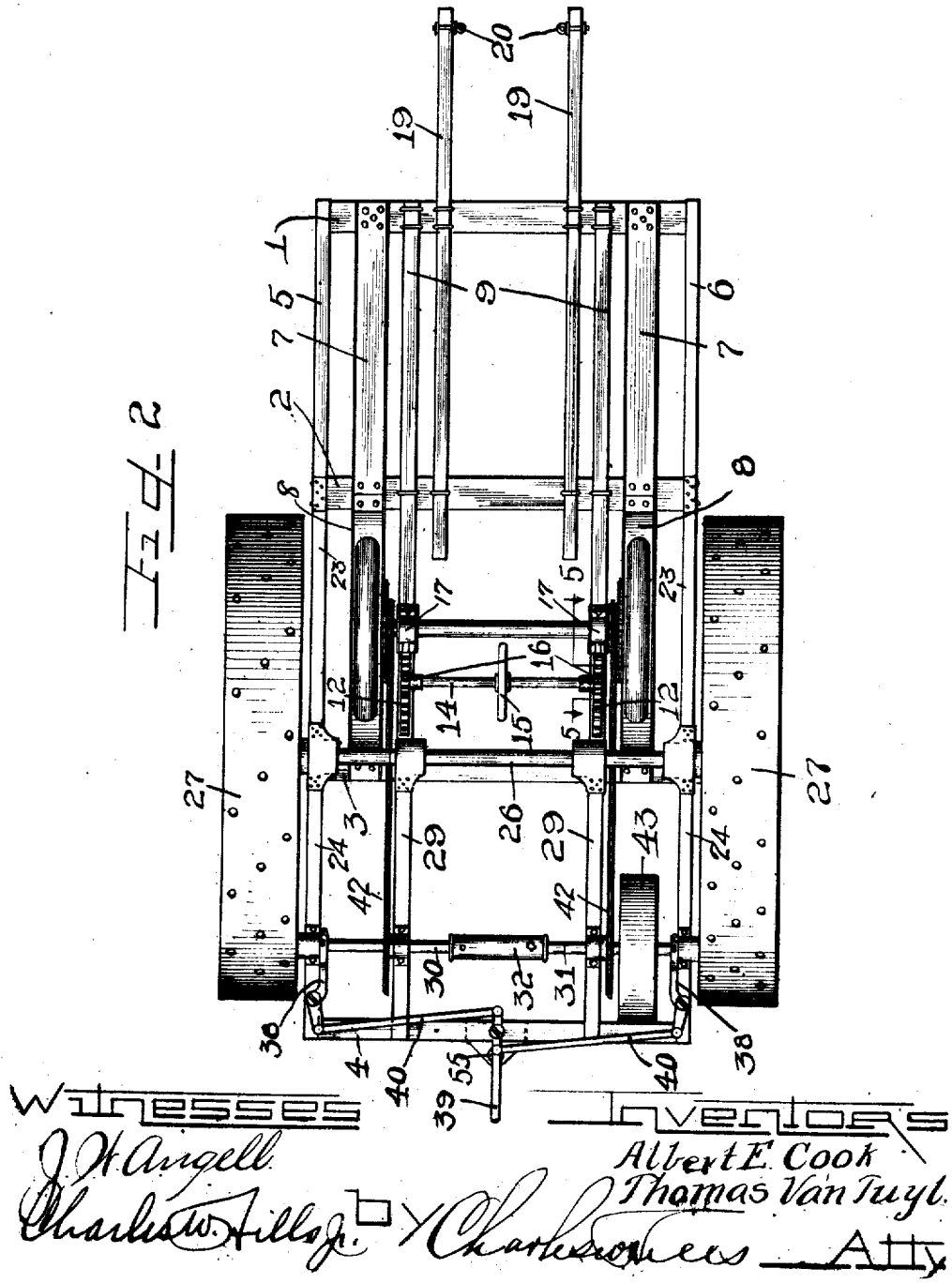

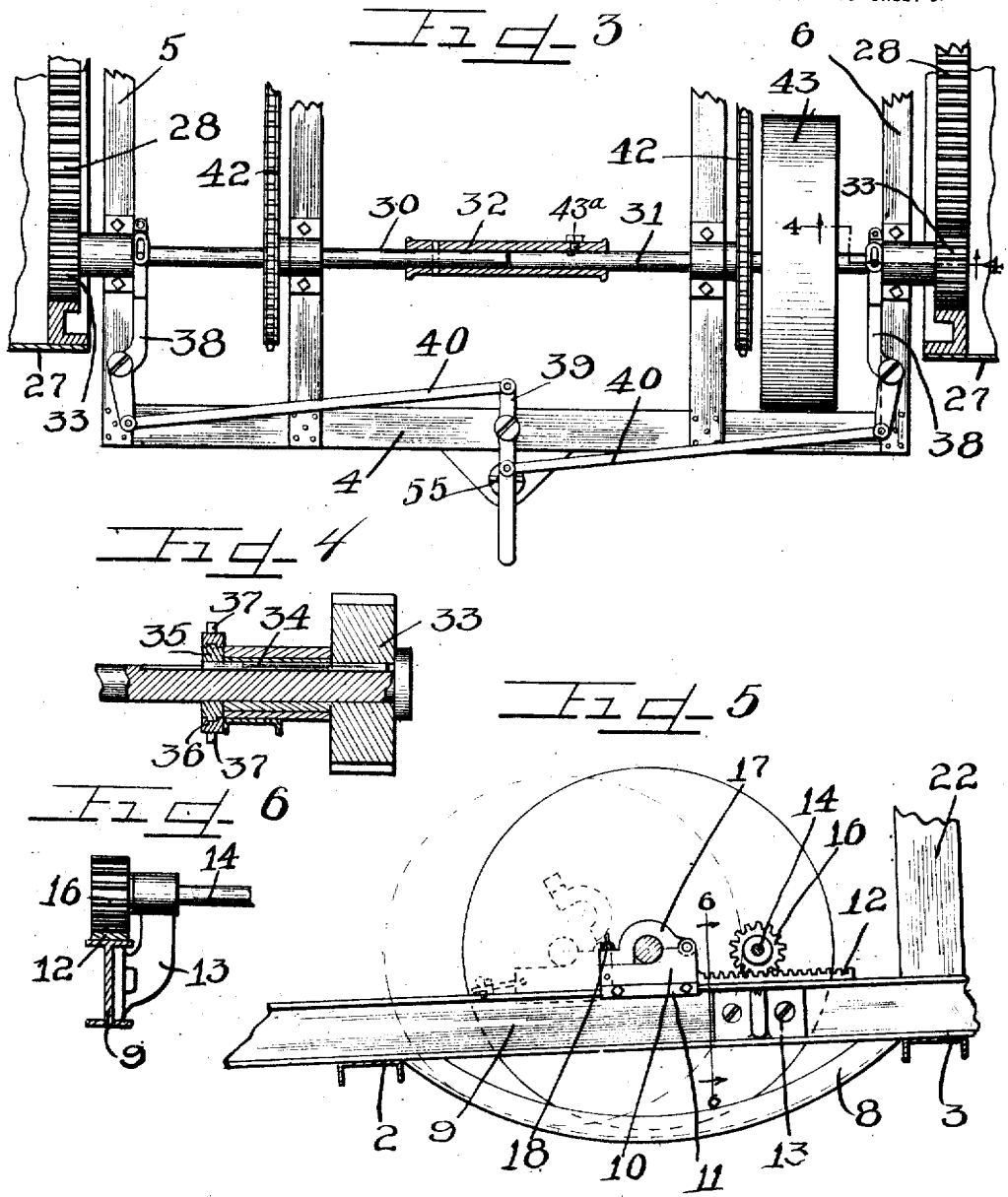

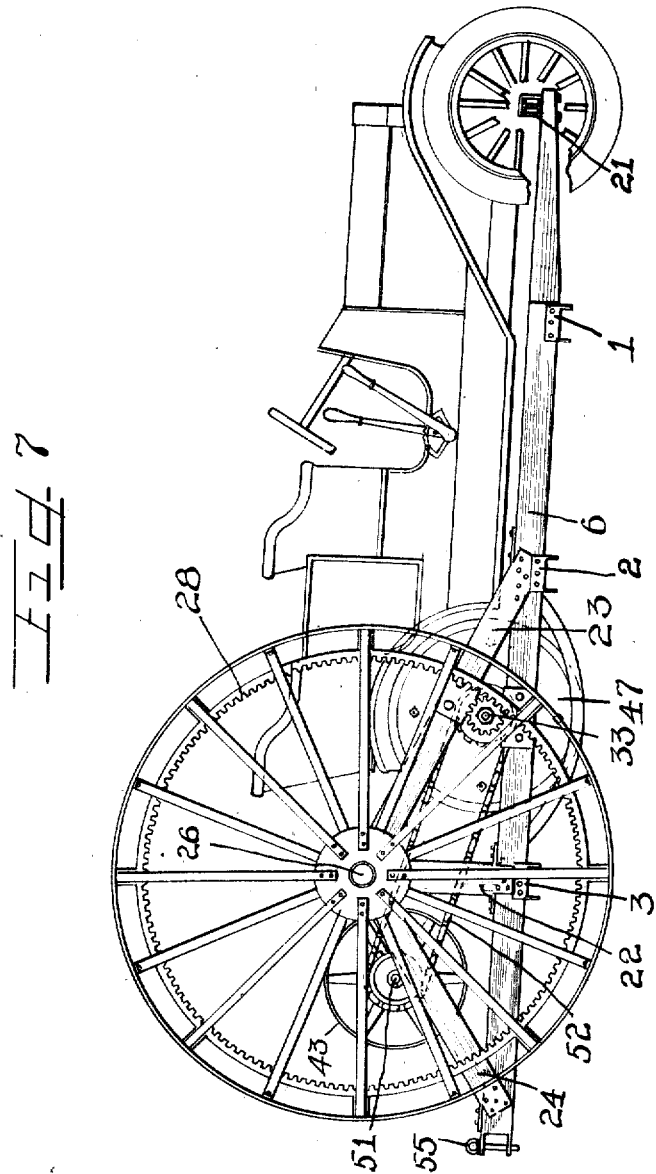

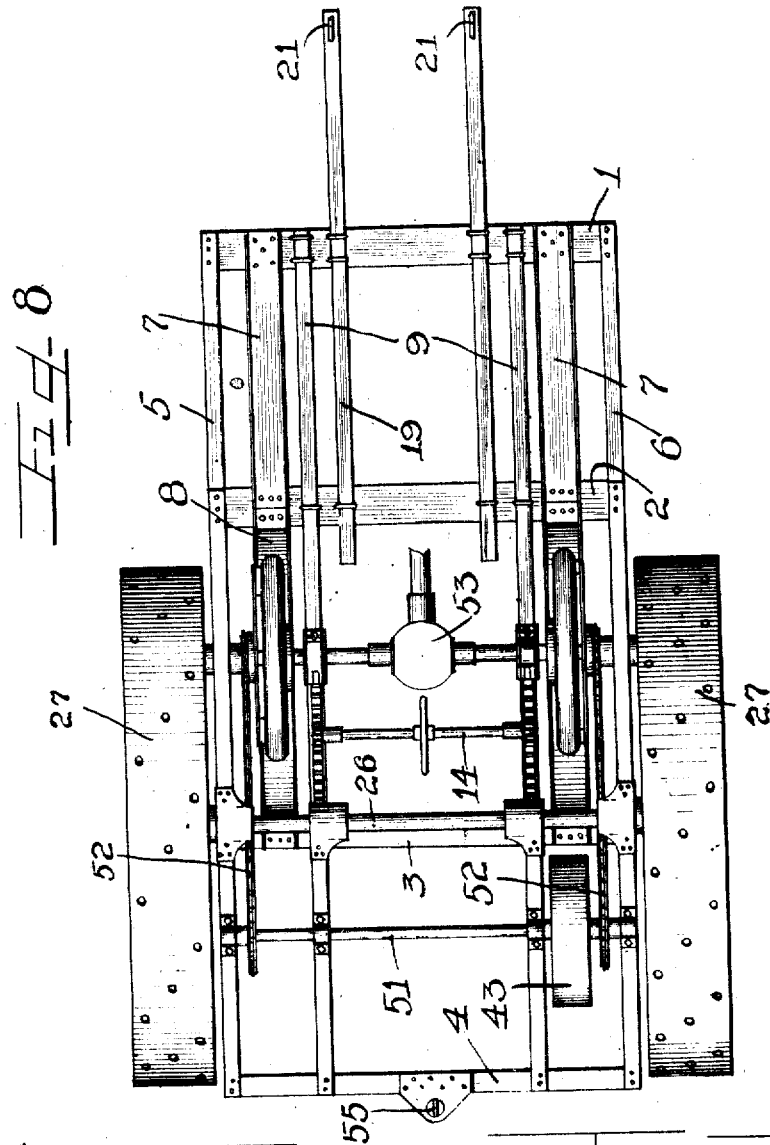

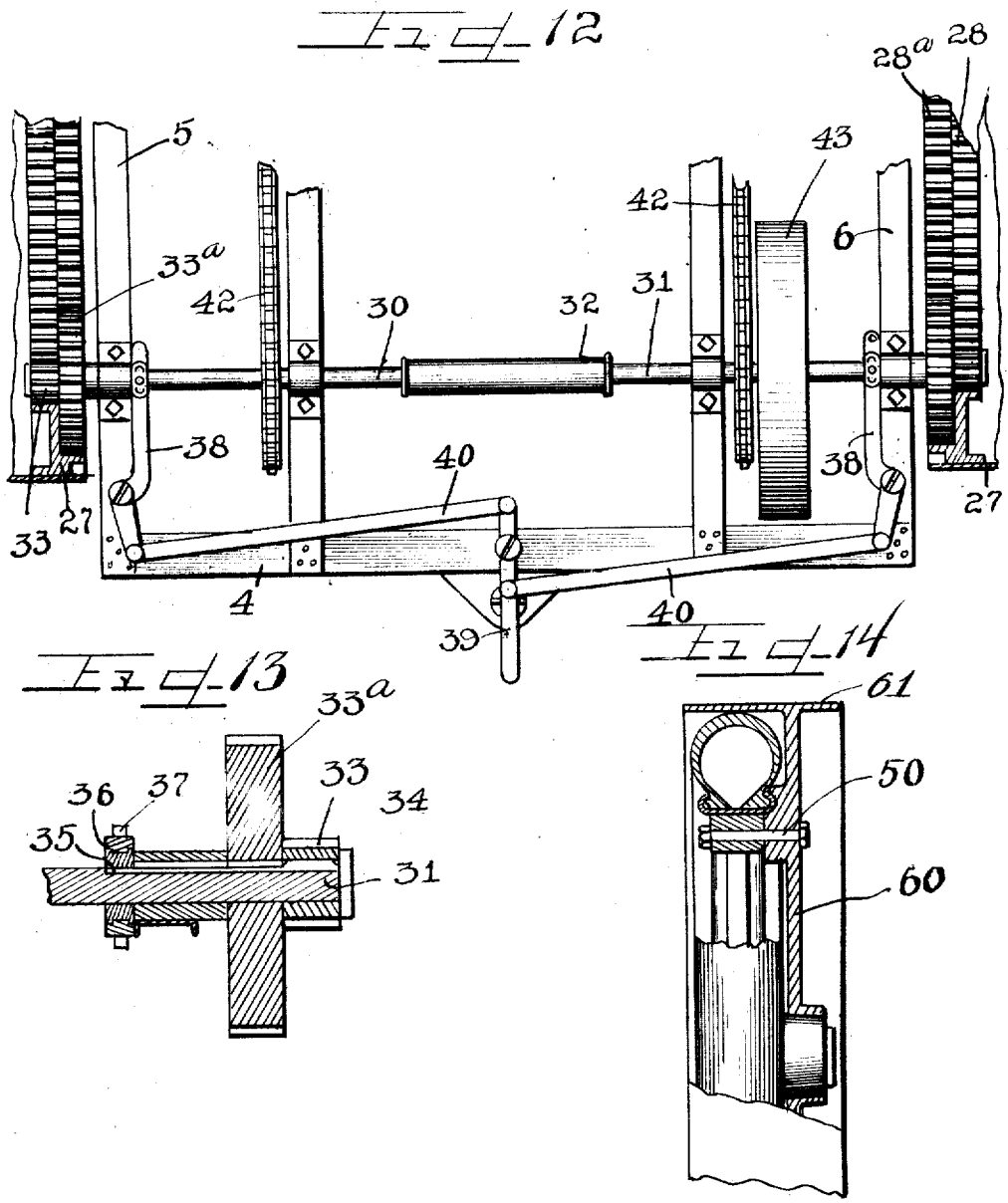

UNITED STATES PATENT OFFICE.

ALBERT E. COOK, OF ODEBOLT, IOWA, AND THOMAS VAN TUYL, OF KANKAKEE,
ILLINOIS; SAID VAN TUYL ASSIGNOR TO SAID COOK.

TRACTION ATTACHMENT FOR AUTOMOBILES.

1,180,475.  Specification of Letters Patent.  Patented Apr. 25, 1916.

Application filed December 17, 1910. Serial No. 597,867.

*To all whom it may concern:*

Be it known that we, ALBERT E. COOK, of the city of Odebolt, in the county of Sac and State of Iowa, and THOMAS VAN TUYL, of the city of Kankakee, in the county of Kankakee and State of Illinois, citizens of the United States, residents as above described, have invented certain new and useful Improvements in Traction Attachments for Automobiles; and we do hereby declare that the following is a full, clear, and exact description of the same, reference being had to the accompanying drawings, and to the numbers of reference marked thereon, which form a part of this specification.

At the present time the automobile is going extensively into use among farmers both for use as a pleasure vehicle and also for the marketing of the crops, and for such other uses, pleasure or otherwise, as the same may be readily available for upon the road, until today very many farmers in all sections of the country are using the automobile extensively. Motor driven tractors are also used to some extent upon large farms. These have been constructed of various types and as heretofore constructed are each provided with its own motor, (sometimes an internal combustion engine), and are so constructed as to enable them to be used for many purposes about the farm and upon the road. Very much of the work done about the farm may be mechanically accomplished with such tractors, but heretofore the large expense of such devices and the fact that they are invariably unsuited for pleasure purposes or for rapid speed upon the road, have deterred the vast majority of farmers who might otherwise be able to use the same, of availing themselves of their use.

The object of this invention is to provide a tractor attachment for use with, and adapted to be propelled by an automobile of any kind or character, and by the use of which the owner of an automobile may have available at all times a powerful tractor adapted for use upon the road, in pulling loaded trailers or farm trucks to market or available about the farm for any of the purposes for which tractors are capable of use.

It is also an object of the invention to provide a tractor attachment for automobiles in which the automobile is utilized to afford the power, and in connection with which is provided mechanism whereby the power derived from the automobile motor may be utilized for pumping or for any other purpose, while the tractor remains stationary.

It is a further object of the invention to afford a power attachment for general purposes adapted for use in connection with an automobile for traction or for any power purposes within the capacity of the motor of the automobile.

It is further an object of the invention to afford a tractor attachment for automobiles on which the automobile, in part, is supported, and which is provided with mechanism for connecting the driving mechanism of the automobile with the tractor either for propulsion of the tractor or for other power purposes.

It is, of course, an important object of the invention to afford an exceedingly strong, simple, durable and cheap construction of the class described whereby the owner of an automobile may have at hand a powerful portable power attachment so constructed as to permit the connection thereof with the automobile to be quickly, easily and cheaply effected.

The invention consists in the matters hereinafter described and more fully pointed out and defined in the appended claims.

In the drawings: Figure 1 is a side elevation of a device embodying my invention, showing the same connected with the automobile. Fig. 2 is a top plan view thereof with all, except the rear axle and wheels, of the automobile omitted. Fig. 3 is a fragmentary detail section on line 3—3 of Fig. 1, and showing also the jack shaft coupling in longitudinal section. Fig. 4 is a fragmentary section on line 4—4 of Fig. 3. Fig. 5 is an enlarged fragmentary section on line 5—5 of Fig. 2. Fig. 6 is a fragmentary section taken on line 6—6 of Fig. 5. Fig. 7 is a side elevation of a slightly modified drive for the tractor. Fig. 8 is a top plan view thereof similar to Fig. 2. Fig. 9 is a rear elevation partly broken away, of the same. Fig. 10 is a view partly in elevation and partly in section, illustrating one means for coupling the drive of the automobile with the tractor shown in Figs. 7, 8 and 9. Fig. 11 is a section on line 11—11 of Fig. 10. Figs. 12 and 13 are fragmentary and sectional views illustrating a change speed drive on the tractor. Fig. 14 is a fragmentary and sectional view indicating a flat tread attachment.

As shown in the drawings, a main frame for the tractor is provided comprising transverse beams or bars conveniently of structural steel (channels are shown) and indicated from the front toward the rear of the machine by 1, 2, 3, and 4. Rigidly bolted or otherwise secured at the extremities of said beams and extending transversely thereof in parallel relation, are the side sills 5 and 6, which also may be of structural steel or any other suitable material. Extending longitudinally the frame thus formed, and rigidly bolted on the transverse bars or beams 1, 2, and 3, are channels, the flanges of which are turned upwardly, as shown in Figs. 2 and 8, and which are arranged between the side sills 5 and 6, and a distance apart equal to the gage of the wheels of the automobile to be used therein, that is to say, said channels are arranged a distance apart at centers equal to the distance between centers of the rear automobile wheels. Said channels at their front ends and between the transverse bars 1 and 2, comprise a straight portion 7, and the portion extending from the bar 2, rearwardly to the bar or beam 3, curves downwardly, as shown, said downwardly curving portion being indicated by 8.

Extending longitudinally of the frame between the channeled tracks thus formed, are I-beam bearing sills 9, which are secured on each of the said transverse frame bars and are spaced a distance apart sufficient to permit the brake drum on each rear automobile wheel to pass on the outer side thereof with sufficient clearance when the rear wheels enter the curved portion of said track. Slidably secured on each of said bearing sills 9, as shown in Fig. 5, is a sliding bearing comprising a bearing or box 10, provided on the under side thereof with gripping jaws 11, which engage beneath the laterally directed flanges of the I beams forming said bearing sills. Rigidly engaged on each of said boxes 10, and extending rearwardly, is a rack bar 12, and journaled in a bracket 13, rigidly secured on the inner side of each of said bearing sills, is a shaft 14, provided with a hand wheel 15, for adjustment. On each end of said shaft is a pinion 16, which meshes with said racks on said boxes to slide the boxes on the sills. The automobile is backed into the tractor, the rear wheels tracking on the channel tracks 7. Said sliding boxes 10, are moved forwardly by means of said hand wheel and shaft to the position shown in dotted lines in Fig. 5, to receive the axle, and thence moved rearwardly by the same means until the rear wheels of the automobile clear the downcurved channels 8, thus leaving the wheels free to rotate. A cap 17, is provided on said box 10, and a bolt, tail nut, or other suitable securing means 18 is provided on the front end of the box and cap to secure the same in closed position after the axle is inserted therein.

Rigidly secured on the beams 1 and 2, as shown in Fig. 2, and between the bearing sills 9, are sills 19, which extend forwardly from the bar 1, or front end of the sill of the frame, to a distance corresponding with the position of the front axle of the automobile when the rear axle is in place in said tractor. Said bars are arranged a distance apart sufficient to permit the same to extend between the front wheels of the automobile affording sufficient clearance on each side thereof for steering. They are provided at their front end with stirrups or supporting straps 20, as shown in Fig. 1, which may engage over the front springs of the automobile near the axle thereof when the front end of the frame is elevated, as shown in Fig. 1, or may be provided with U bolts 21, to receive the axle at the inner side of each spring, as shown in Figs. 7 and 8.

An upwardly extending post or strut 22, is provided on each end of the frame bar 3, and is rigidly secured thereon and to the side sill members 5 and 6. Rigidly secured thereto at the top thereof and extending downwardly and forwardly, and downwardly and rearwardly, are braces 23 and 24, which are secured respectively, the braces 23 to the transverse beam 2, and to the side sills 5 and 6, and the rear brace bars 24 to the rear sill and to said side sill in any suitable manner to afford sufficient rigidity.

As shown in Fig. 1, a plate 25, affords the rear connection and is riveted or bolted or otherwise rigidly secured to said brace bars 24, and to said sills and extends forwardly from the rear end of said brace bars and sills to a point intermediate the post 22, and the rear end of the frame and serves also as a brace for said rear brace member.

Journaled on the top of said posts is the main shaft or axle 26, of the tractor, rotatably secured on which at each end thereof are the broad faced tractor wheels 27, which are shaped as usual, and may have any tread surface desired or preferred. Each of said wheels is provided with an internal gear 28, near its periphery, as shown in Figs. 1 and 7. Journaled on the brace bars 24, and also upon brace bars 29, which extend from the rear end sill 4, to the tractor axle 26, is a jack shaft constructed in two sections 30 and 31, held in alinement in said bearings and also by means of a sleeve 32, in which is rigidly secured the inner end of the shaft section 30, and in which the inner end of the shaft 31, is rotatably engaged, as shown in Fig. 3. Each of said shaft sections is provided at its outer end with a pinion 33, meshing with the internal gear 28, in the tractor wheels and held in driving relation on the jack shaft by means of any suitable clutch which permits said pinions to rotate on the shaft when the clutch is released. For this purpose, any suitable clutch may be employed. A simple type of key clutch, however, is shown, in which a key 34, is secured to a collar 35, and is slidably engaged in a suitable key seat in the jack shaft. Said key is of sufficient length to permit the same to be projected into a suitable key seat in the pinion 33, as shown in Fig. 4. An adjusting ring 36, is provided on the collar 35, and in which said collar rotates, and is provided with oppositely directed pins 37, in a familiar manner, which are engaged by the longitudinally slotted and yoked ends of a lever 38, fulcrumed on the side sill. the other end of which extends rearwardly. A lever 39, is fulcrumed on the rear end sill, and pivotally engaged on opposite sides of the fulcrum thereof are connecting rods 40, which extend laterally and at their outer ends are engaged to the shifting levers 38 for the clutch.

If preferred, a low and a high speed drive may be afforded for the tractor. This is accomplished by providing two internal gears 28—28ª, of different diameters in the tractor wheels, and providing two driving pinions 33—33ª, of suitable diameters on the shaft sections 30—31, meshing therewith. When so arranged the key 34, is of a length to engage in the respective pinions at the opposite limits of its adjustment to communicate the drive to the tractor through either, as shown in Figs. 12 and 13.

Each of the rear automobile wheels is provided at the inner side of the brake drum with a double sprocket wheel rigidly secured thereto, as is usual with a single sprocket wheel in double chain drive machines, and secured on each section of the jack shaft in alinement with the inner sprocket wheel of each pair, is a sprocket wheel, as shown in Fig. 1, and about each pair of alined sprocket wheels are trained sprocket chains 42, as shown in Figs. 1, 2 and 3. whereby the drive is communicated from the motor to the rear wheels and thence to the jack shaft.

A belt pulley 43, is provided on the jack shaft section 31, and a set screw, drift pin or any other releasable means 43ª is provided for engaging the inner end of the jack shaft section 31, in the sleeve 32, when it is desired to take the power from said belt wheel, thereby enabling the drive to be imparted to said belt wheel from both driving chains, though, of course, when using the machine as a tractor, said set screw, drift pin or other releasing means is released and removed to permit differential movement of the jack shaft sections which is compensated as is usual in the differential gears on the automobile.

The construction shown in Figs. 7 to 11 inclusive, is substantially the same in all particulars as that before described with the exception that the drive is imparted to the wheels in advance of the center instead of at the rear thereof, and the driving connections are illustrated more particularly with reference to a shaft drive car. The frame may be identical in all respects with that before described, and also the bearings or supports on the bearing sills whereby the rear wheels of the car are elevated and supported above the brackets therefor.

Rigidly secured between the brace bar 23, and the side sills 5 and 6, is a bearing 44, in which is journaled a shaft 45, on the outer end of which is rigidly secured the driving pinion 33, such as before described, and which meshes with the internal gear 28, in the tractor wheel, as shown in detail in Fig. 10. Said shaft is provided on its inner end adjacent the frame with a sprocket wheel 46, on the inner face of which is rigidly secured a disk wheel or spider 47, of less diameter than the automobile wheel and carrying on the inner face thereof near its periphery, clamps embracing a fixed jaw 48, and an inner movable jaw 49 to coact therewith, and adapted to grip or engage the rim 49ª or any portion of the automobile wheel, as shown, preferably near the periphery. Clamping bolts 50, are provided to draw said clamping jaws into gripping relation with the wheel to rigidly connect said shaft 45, in axial alinement with the rear axle of the automobile.

Journaled on the rear brace bars 24, is a shaft 51, provided at each end with a sprocket wheel in alinement with the sprocket wheels 46, before described on each side the tractor, and sprocket chains 52, are trained about the same to drive said shaft 51. A belt pulley 43, such as before described, is provided on said shaft. Inasmuch as the rear axle of the automobile is provided with a differential 53, as is usual, a differential in the shaft 51, is not required.

The operation is as follows: The automobile is backed into the tractor, the rear wheels of the car moving inwardly along the channel track 7 and 8. The bearing 10, is, of course, first moved forwardly to the position shown in dotted lines in Fig. 5, to receive the automobile axle thereon and the box having been closed and secured in any suitable manner, both boxes (and, of course, the automobile), are drawn rearwardly by rotation of the shaft 14, until the automobile wheels have cleared the track upon which previously supported. The front end of the tractor frame is then elevated and secured in any suitable manner between the front wheels of the automobile, and, for this purpose, may be secured either to the front axle or to the front springs or in any suitable manner retained in such elevated position. If a chain drive machine is used, as shown in Figs. 1 to 6 inclusive, the sprocket chains driving to the power shaft are now trained around their sprocket wheels and connected by any suitable master link, and the machine is ready for operation. If a shaft drive automobile is used, instead of a chain drive, the connection, may, of course, be made in the same manner or the driving connection with the tractor wheels may be made directly from the automobile axle or wheel to the pinion. In other words, the automobile having been drawn into the tractor, as before described, and adjusted with reference to the alinement of the shaft 45, the clamps are engaged with the wheels and the chains trained about the sprocket wheels 46, and thus on the shaft 51. Of course, if preferred, the automobile wheels might be removed and a suitable connection effected directly with the then exposed ends of the automobile axles. Having properly positioned and connected the automobile with the tractor, the operation of the machine for traction purposes is effected from the driver's seat in the automobile, as is usual. Of course, where the construction shown in Figs. 1 and 2, is used, the clutch lever is adjusted to rigidly secure the pinions upon their shafts. The machine may now be used for any of the purposes for which any tractor may be used, either upon the road or in the usual or any work for which a tractor may be employed. Owing to the relative sizes of the pinions and internal gears and tractor wheels, a very great reduction of speed is afforded with consequent increased power and this enables any and all the speed adjustments and the reverse of the automobile to be used with the same effect as ordinarily, excepting, of course, that the speed of the tractor shall necessarily be much less owing to the reduction before mentioned than in the case of the same speed adjustment of the automobile when not connected with the tractor.

Should it be desired to use the tractor upon soft ground as may frequently occur, a band wheel may be substituted on the front axle in lieu of the ordinary automobile wheels or any suitable spider 60 carrying a flat or other suitably shaped broad rim 61 may be detachably secured on the outer side of each front wheel to cover and to extend around the pneumatic tire, as seen in Fig. 14. This is not necessary for road use and ordinarily may not be necessary for field use.

When it is desired to use the machine for other power purposes than for traction, it is only necessary, in the construction illustrated in Figs. 1 to 5, inclusive, to throw the clutch out of engagement with the pinions 33, and, of course, the same effect may be attained by removing the nut from the shaft 45, to permit the pinion 33, to be slipped from the shaft, thus disconnecting the drive from the tractor wheels, in either case permitting the machine to be used for any power purposes, transmitting the power from the belt pulley 43, by means of a suitable belt.

The construction shown is exceedingly simple and comparatively inexpensive, as well as exceedingly economical in operation, permitting the automobile to be used for the usual and ordinary purposes when desired, and to be utilized as a component part of the tractor when such service is required. If, instead of a pleasure vehicle, an automobile truck be used, as indicated in Fig. 1, then the tractor may itself be loaded as well as draw a number of trucks or trams thereafter upon the highway, and of course, for this purpose is provided at the rear end of the frame with any suitable bolt or coupling 55, to permit attachment of such trams.

For the purpose of adapting the tractor for use with automobiles of different wheel bases, the bars 19, are connected with the transverse beams 1 and 2, by means of U bolts, which permit the same to be adjusted longitudinally of the frame by slightly loosening the U bolts to afford the desired adjustment. Of course, the U bolts are then set up again to rigidly engage said bars in adjusted position.

By affording a low and a high speed drive for the tractor, as, for example, shown in Figs. 12 and 13, a slow drive is afforded through the small pinion 33, for plowing, or when heavily loaded or pulling loaded trams on the road, and a high speed through the pinion 33ᵃ, when not heavily loaded or with empty trams, these speed changes being effected independently of the speed adjustment of the automobile transmission and enabling the most economical fuel consumption to be secured.

While we have shown a particular frame construction, it is to be understood that the frame may be varied in many particulars as may also the particular way of connecting the drive of the automobile with the tractor wheels for affording the power connection for the belt pulleys. We have shown but one of numerous arrangements which will readily be understood from the foregoing specification, and we purpose claiming broadly any arrangement whereby an automobile and tractor attachment may be connected with an automobile and driven by the automobile power plant of whatsoever kind. We therefore do not purpose limiting the patent for this invention otherwise than necessitated by the prior art, as numerous details of construction may be varied without departing from the principles of our invention.

We claim as our invention:

1. The combination with a single pair of tractor wheels, of means between said wheels for supporting the rear end of an automobile with its rear wheels out of driving contact and with its front wheels on the ground, the whole affording a four wheel vehicle, and driving connections between the power plant of said automobile and said tractor wheels.

2. The combination with a single pair of tractor wheels, of a frame supported thereon, means on said frame for supporting the rear wheels only of an automobile out of driving contact and between the said tractor wheels, the whole affording a four wheel vehicle, and driving connections between the power plant of the automobile and the tractor wheels.

3. The combination with a single pair of tractor wheels, of means thereon acting to support the rear end of an automobile between the same with its rear wheels only out of driving contact, the whole affording a four wheel vehicle, releasable driving connections between the power plant of the automobile and said tractor wheels, and a belt pulley carried by said tractor wheels and also driven by said power plant.

4. A device of the class described embracing a pair of tractor wheels, an automobile connected therewith and supported at its rear end wholly thereon, and with its rear wheels only elevated out of driving contact, a jack shaft, a belt pulley thereon, and connections for driving said tractor wheels and jack shaft from the power plant of the automobile.

5. A device of the class described embracing tractor wheels, an automobile connected therewith and supported and elevated at its rear end wholly thereon in inclined position with its own rear wheels out of driving contact, a jack shaft, connections with the power plant of the automobile for driving the jack shaft and the tractor wheels, and means for disconnecting one of the same from such driving connections.

6. A device of the class described embracing a pair of tractor wheels, a frame supported thereon and affording an inclined plane to permit backing an automobile upon the same, a part of said frame adapted for connection with the front of the automobile whereby the steering is effected by the front automobile wheels and driving connections between the tractor wheels and the automobile power plant.

7. A device of the class described embracing a pair of tractor wheels, a frame thereon including a track for the rear wheels of an automobile, means shifting said rear automobile wheels out of contact with the track and rigidly connecting the automobile in place, and driving connections between the tractor wheels and automobile power plant.

8. The combination with an automobile of a pair of tractor wheels, a frame supported thereon, and affording in one position an inclined plane to elevate the rear end of the automobile thereon, means for supporting the front end of said frame at the front end of the automobile after such elevation of the rear end, and driving connections between the tractor wheels and the power plant of the automobile.

9. The combination with an automobile of a pair of tractor wheels, a frame, including a track for the rear automobile wheels, supported thereon, and affording in one position an incline to elevate the rear end of the automobile thereon, means rigidly connecting the automobile at its rear end with the frame, and means on said frame adapted to support the front end thereof on the front end of the automobile after such elevation of the rear end and driving connections between the tractor wheels and the power plant of the automobile.

10. The combination with an automobile of a pair of tractor wheels, a frame supported thereon, and affording means to elevate the rear end of the automobile thereon, means on said frame for rigidly engaging the rear axle of the automobile thereto with the wheels elevated, means supporting the front end of the frame on, and securing the same to the front end of the automobile, and driving connections between the tractor wheels and the power plant of the automobile.

11. The combination with an automobile of a pair of tractor wheels, a frame supported thereon, and affording an incline to elevate the rear end of the automobile thereon, means on said frame for rigidly securing the rear axle thereto with the wheels elevated out of contact with the frame, clamping means for supporting and securing the front of the frame on the front axle of the automobile after such elevation of the rear end and driving connections between the rear automobile wheels and the tractor wheels.

12. In a machine of the class described a pair of tractor wheels, a frame carried thereby, a power shaft journaled on the frame, a belt wheel on the power shaft, means supporting the rear end of the automobile on said frame with the rear wheels thereof only elevated above the frame, and driving connections with the automobile wheels for driving the tractor wheels and said belt pulley simultaneously.

13. In a machine of the class described tractor wheels, a frame, a track thereon for the rear automobile wheels, a downcurved portion in said track to clear said wheels when in operative position, a slidable bearing adapted to receive the rear axle at the entrance to the curved portion of the track, means shifting said bearing rearwardly to draw the car into the frame and clear the wheels from the track, means supporting the front end of the frame, and connections with the automobile axle for driving the tractor wheels.

14. In a machine of the class described tractor wheels, a frame, a track thereon for the rear automobile wheels, an adjustable slide bearing for each end of the automobile rear axle, means simultaneously shifting said bearing in one direction to receive the ends of said axle and oppositely to clear the wheels from said track and to support the rear end of the automobile, and driving connections between the tractor wheels and the power plant of the automobile.

15. The combination with an automobile of tractor wheels normally supporting the rear wheels of said automobile above normal, a frame therefor, means partially supporting said frame on the front axle of said automobile, and driving connections between the automobile driving gear and the tractor wheels.

16. The combination with an automobile of a two wheeled speed reducing power tractor connected with, and driven by the driving mechanism thereof and a speed changing mechanism on the tractor.

17. In a device of the class described a tractor frame, adapted to be engaged at the rear end of an automobile to support the same, tractor wheels on said frame, driving connections between the driving wheels of the automobile and said tractor wheels, members on said frame extending forwardly to engage the front end of the automobile, and gear reduction mechanism disposed rearwardly of said tractor wheels acting to balance the tractor frame and relieve said automobile of stresses other than those due to propulsion.

18. In a tractor attachment for automobiles, a wheeled tractor frame to support one end of the automobile, movable clamping members adapted to clamp the rear axle of the automobile to the tractor frame, driving connections between the driving wheels of the automobile and the tractor wheels, and members on said frame adapted to be extended forwardly and be clamped to the front of said automobile.

19. In a tractor attachment for automobiles a pair of relatively large tractor wheels, annular gears therein a frame centered between the wheels, track members on the frame to receive the rear wheels of the automobile to elevate the automobile to position under its own power, means clamping the rear axle of the automobile and moving the automobile to a position with the rear wheels out of contact with the track members, and mechanisms connected to said wheels and adapted to drive the tractor wheels through said annular gears.

20. In a tractor attachment for automobiles, means permitting the elevation of the rear end of the automobile thereon under its own power, clamping elements on the tractor to hold the automobile thereon, and driving connections between the driving gear of the automobile and the tractor wheels.

21. In a machine of the class described a tractor frame, means permitting an automobile to be elevated thereon under its own power, and means on said frame engaging the rear axle of the automobile thereon, adjustable means for engaging the front axle to support a portion of the tractor frame, and driving connections between the tractor and the rear wheels of the automobile.

22. In a tractor attachment for automobiles a pair of tractor wheels, a frame adapted to be attached to the front and rear axles of an automobile respectively, and driving connections between the automobile driving gear and the tractor wheels.

23. In a device of the class described a frame, means adjustably engaging the front and rear axles respectively of an automobile thereto, said front axle acting to support a part of the frame, said frame acting to support the rear axle of the automobile, and tractor wheels supporting said frame and adapted to be driven by the driving gear of the automobile.

24. In a device of the class described tractor wheels, axles journaled therein, a frame suspended from said axles, slidable clamps mounted on said frame, channel members affording a track leading from one end of the frame toward said clamp affording means for backing an automobile on to the frame in position to be engaged by said clamp, and extensible members engaged on said frame and adapted to engage the front end of said automobile.

25. In a device of the class described a pair of tractor wheels, a frame thereon, means supporting one end of an automobile thereon with the rear wheels only out of contact with the ground, driving connections between the tractor wheels and the driving gear of the automobile, means adjusting the automobile relatively to the tractor frame while supported thereon, and means changing the speed of the tractor wheels independently of the automobile gear.

26. In a device of the class described, a tractor attachment for automobiles affording when assembled, a four wheel vehicle, means supporting the rear end of an automobile thereon, driving connections between the power plant of the automobile and the tractor to propel the tractor and automobile, and means for adjusting the length of the tractor to adapt it to be attached to automobiles of different lengths.

27. A tractor, embodying a pair of wheels, a frame supported thereby, and track members carried by said frame and adapted to rest at their outer ends on adjacent to the ground or to be raised therefrom.

28. A tractor, embodying a pair of wheels, a frame supported thereby, track members carried by said frame and adapted to rest at their outer ends on adjacent to the ground or to be raised therefrom, and means on said frame for raising and supporting the rear wheels of an automobile above normal.

29. In a tractor attachment for automobiles, a pair of tractor wheels, a frame connected therewith and adapted to be attached to the front and rear of an automobile, and driving connections between the automobile driving gear and the tractor wheels.

30. In a tractor attachment for automobiles, a pair of tractor wheels, a frame therefor adapted to support the rear wheels of an automobile out of driving contact, said frame adapted to be detachably supported by the front end of said automobile, and driving connections between the automobile driving gear and the tractor wheels.

31. The combination with a single pair of tractor wheels, of means between said wheels for supporting the rear end of an automobile with its front wheels on the ground, the whole affording a four wheel vehicle, and driving connections between the power plant of said automobile and said tractor wheels.

32. The combination with an automobile, of a pair of tractor wheels, a frame supported thereon and affording means to elevate the rear end of the automobile thereon, means on said frame for rigidly engaging vate the rear end of the automobile thereon, means supporting the front end of the frame on and securing the same to the front end of the automobile, and driving connections between the tractor wheels and the power plant of the automobile.

33. In a tractor attachment for automobiles, a pair of tractor wheels, a frame therefor adapted to support the rear end of an automobile in elevated position, said frame adapted to be detachably supported by the front end of said automobile, and driving connections between the automobile driving gear and the tractor wheels.

In testimony whereof we have hereunto subscribed our names in the presence of two subscribing witnesses.

ALBERT E. COOK.
THOMAS VAN TUYL.

Witnesses:
EDNA M. HANSON.
R. W. SAYRE.

Correction in Letters Patent No. 1,180,475.

It is hereby certified that in Letters Patent No. 1,180,475, granted April 25, 1916, upon the application of Albert E. Cook, of Odebolt, Iowa, and Thomas Van Tuyl, of Kankakee, Illinois, for an improvement in "Traction Attachments for Automobiles," an error appears in the printed specification requiring correction as follows: Page 7, claim 32, strike out line 41 and insert the words *the rear axle of the automobile thereto;* and that the said Letters Patent should be read with this correction therein that the same may conform to the record of the case in the Patent Office.

Signed and sealed this 21st day of November, A. D., 1916.

[SEAL.]

F. W. H. CLAY,
*Acting Commissioner of Patents.*

Cl. 21—114.